March 20, 1962 A. CHAIMOWICZ 3,026,499

INFORMATION STORAGE APPARATUS

Filed March 29, 1957 2 Sheets-Sheet 1

INVENTOR
ADAM CHAIMOWICZ
BY Kane and Nydick
ATTORNEYS

INVENTOR
ADAM CHAIMOWICZ
BY Hane and Nydick
ATTORNEYS 3,026,499

INFORMATION STORAGE APPARATUS

Adam Chaimowicz, Stevenage, England, assignor to International Computers and Tabulators Limited, London, England Filed Mar. 29, 1957, Ser. No. 649,460
Claims priority, application Great Britain Apr. 6, 1956
15 Claims. (Cl. 340—174)

The invention relates to information storage arrangements.

With such arrangements it may be desirable to re-insert data which has been read-out, in the same or different form, and in the same or a different location in the arrangement as, for example, when normal readout is destructive and it is desired to retain the data in the store for further read-out operations. Or it may be desired to process the data by coding it or by shifting it with respect to its initial position.

It is an object of the invention to provide a data storage arrangement employing elements settable to either one of two conditions to represent data and provided with means for re-inserting into the storage data read out therefrom.

According to the invention information storage apparatus includes a plurality of bi-stable state elements adapted to represent stored information by their states, a plurality of signal gating devices, each gating device being responsive to a first signal representing the state of one of said elements to generate an output signal which is adapted to set any one of a sub-group of two or more of said elements to the state represented by said first signal, and means adapted to control the gating means to select which element of said sub-group of elements is set by the output signal. The first signal may be generated by means adapted to reset each of the elements to a first state. The elements may be arranged in groups with means to generate said first signal selectively for any one of the elements in a group.

The invention will now be described, by way of example, with reference to the accompanying drawings in which.

The invention will first be described as applied to a matrix type storage arrangement comprising rows and columns of magnetic cores of the kind which can be switched between two states of magnetic saturation, referred to as the set and reset states of the core. These two states represent a binary "one" and "zero" respectively.

Figure 1:
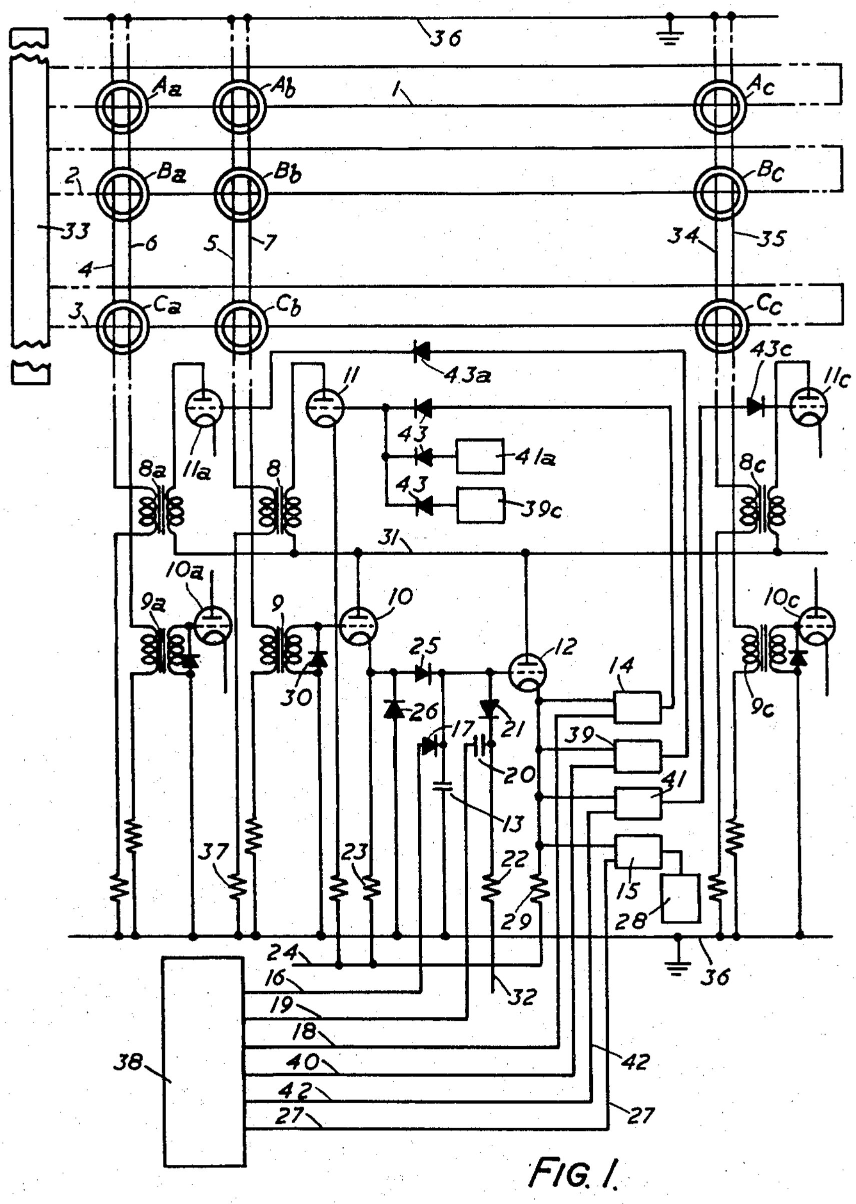
FIGURE 1 is a circuit diagram of data inserting and read-out arrangements for part of a magnetic core storage matrix, with certain parts shown in schematic form.

FIGURE 1 shows three adjacent rows A, B, and C of three adjacent groups or columns *a*, *b* and *c* of such a matrix. The individual cores are referenced with the two letters indicating the row and column in which they occur. Each row, A, B, and C is threaded by a winding 1, 2 and 3 respectively, controlled by a selector circuit 33. The cores of column *a* are threaded by two windings 4 and 6 and those of columns *b* and *c* similarly by windings, 5, 7, and 34, 35 respectively.

Considering first the cores of column *b*, the direction of the windings is such that a core can be set by the joint effect of two simultaneously applied half-currents, one on winding 5 and the other on either 1, 2 or 3 according to the row in which setting is required. A set core can be reset by the application of a single reverse current of sufficient amplitude applied to one of the row windings 1, 2 or 3. When a core is reset, an output pulse is produced in winding 7.

The half-current or reverse full current through a selected row winding is provided by the circuit 33. The half-current through winding 5 is provided by a valve 11 coupled to the winding through a transformer 8, a resistor 37 in the winding circuit serving to limit the current to the required value.

The output winding 7 is coupled through a transformer 9 to a circuit comprising two triode valves 10 and 12, the valve 11 and associated components. This circuit controls write-in, read-out and re-insertion of data in the cores of column *b*. Similar circuits are provided for the other columns, but for convenience only that for column *b* is shown in detail. The valves 10 and 11 and the transformers 8 and 9 associated with the columns *a* and *c* bear the same reference number but have a suffixed *a* or *c* indicating the column with which they are associated. Since reading and writing never take place simultaneously, a single winding may be used to perform the functions of the separate windings 5 and 7.

To write-in a "one" to core A*b* a positive signal representing a "one" digit is applied from a control circuit 38 over a line 16 via a diode 17 to charge a capacitor 13. The charge on the capacitor raises the potential of the control grid of valve 12 connected as a cathode follower. The cathode potential of the valve consequently rises and opens a gate 14 controlled by the valve. A pulse applied to a line 18 connected to gate 14 passes through the gate and is applied to the grid of valve 11. The anode of valve 11 is connected to a positive supply line 31 through the primary of transformer 8, the secondary of which is in series with the winding 5, so that the pulse on the grid of 11 results in a half-current pulse through all the cores in colubn *b*. A simultaneously applied half current pulse on line 1 causes core A*b* to be set. The cores B*d* and C*b* are not set as they only receive the half current pulse on line 5.

The charge on capacitor 13 thus controls the gate 14 via valve 12, so that before the next write-in operation, the capacitor must be discharged. This is effected by the application of a negative pulse on a line 19 which acts via capacitor 20 and a diode 21 to discharge capacitor 13 (FIGURE 2C). The junction of capacitor 20 and diode 21 is connected through a resistor 22 to a positive supply line 32. When capacitor 13 is discharged another write-in operation can take place into the same or a different core of the column. The cathode of 12 is connected through resistor 29 to a negative supply line 24 so that in the absence of a charge on capacitor 13 (representing a "zero") gate 14 is held closed. In this case the half-current pulse on line 1 cannot, in the absence of a complementary pulse on line 5, set the core A*b*.

Since columns *a* and *c* have similar write-in arrangements, the cores A*a*, A*b* and A*c* of row A can be set simultaneously when the write-in signal is applied to line 1. Similarly the cores in row B can be set by the selection of line 2 and so on, clearing pulses on line 19 being applied before each write-in operation.

For reading out data stored in core A*b*, a readout signal is applied to line 1 by the selector circuit 33. The readout signal comprises two parts, a resetting whole-current pulse followed after a short interval by a half-current setting pulse of opposite polarity (FIGURE 2A). When such a signal is applied to line 1, the first part of the signal resets any of the cores in row A which may be set, and in so doing produces an output pulse in the corresponding column lines 6, 7 and 35.

If core A*b* is set when the read-out signal is applied to line 1, the output pulse is applied via the transformer 9 to the grid of valve 10 which acts as a cathode follower. A diode 30 connected across the secondary of transformer 9 ensures that only a positive pulse, resulting from the resetting of a core, is effective, the negative pulse produced across the secondary of the transformer when a core is set, is shorted out by the diode.

Although the cathode of valve 10 is connected through a resistor 23 to a negative supply line 24, it is prevented from falling appreciably below earth potential by virtue of a diode 26 connected between the cathode and the earth line 36.

The cathode of valve 10 is also connected via diode 25 to the junction of capacitor 13 and the grid of valve 12. On the occurrence of an output pulse, the cathode potential of valve 10 rises (FIGURE 2B) and charges capacitor 13. This results in a rise in the cathode potential of valve 12 (FIGURE 2D) as already described. Controlled by the cathode of valve 12 is a gate 15 which is opened by the rise in potential and permits a pulse on a line 27 from circuit 38 to pass to an output utilization device 28 to indicate that a "one" digit has been read-out from column *b* at a time when winding 1 is selected by the circuit 33.

If it is desired to re-insert the data into the same core, a pulse on line 18 causes a half-current setting pulse to be produced in the winding 5. The pulse on line 18 (FIGURE 2E) is coincident with the second part of the read-out signal which consists of a half-current setting pulse, so the setting of core A*b* is restored.

The cathode potential of valve 12 remains high so long as capacitor 13 remains charged, so the pulse on line 27 can be applied at any time, or more than once, between the charging of the capacitor and the application of the clearing pulse on line 19.

In the arrangement just described, valve 12 is connected to re-insert the data read out back into the same column of cores from which the signal resulting in such operation was read out.

If it is desired to shift the data one column to the left, a further gate 39 controlled by the cathode of valve 12 and pulses on a line 40, has its output connected to a valve 11*a* associated with column *a*. Shifting data from column *b* to column *c* can likewise be effected by means of another gate 41 controlled by the cathode potential of valve 12 and pulses on line 42. The output of gate 41 is applied to a valve 11*c* associated with column *c*.

Similarly to insert data into column *b* with a left shift from column *c* or with a right shift from column *a*, valve 11 is controlled by the output from gates 39*c* or 41*a* respectively. Isolating diodes 43 are inserted in the output leads from the gates to prevent interaction.

With a readout signal of the form described, data must be re-inserted into the same row from which read-out was effected. But by applying the first part of the read out signal (a whole current pulse) to one row winding, and the subsequent half current setting pulse to another row winding, the data can be re-inserted into a different row of the matrix.

The gating circuits controlled by valve 12 may be arranged to perform various logical functions so that data may be recoded, for example, in the process of re-insertion.

Although only three rows and three columns of the matrix have been shown in FIGURE 1, it will be appreciated that the actual number of cores used in practice would be determined by the storage capacity desired.

It will be seen that each group of cores forming a column of the matrix supply read out signals to a single re-insertion circuit. The re-insertion circuit acts as a selective gating device to apply a signal to set any one of a sub-group of cores, which may include the core which provided the readout signal. The particular core to be set is determined by which gating circuit is rendered operative by the application of a pulse thereto.

Write-in to the matrix has been described as taking place through the operation of components provided for re-insertion, but the cores could be initially set from an external source by the selective application of digit representing signals to additional setting windings (not shown) on the cores.

The pulses applied on the lines 27, 18, 40 and 42 may be derived from the read-out signal, the process of derivation effecting a delay such that the resulting pulses coincide with the half-current pulse of the read-out signal. Such an arrangement provides automatic timing of the pulses applied to the gates 39, 41, 14 and 15.

Figure 2:
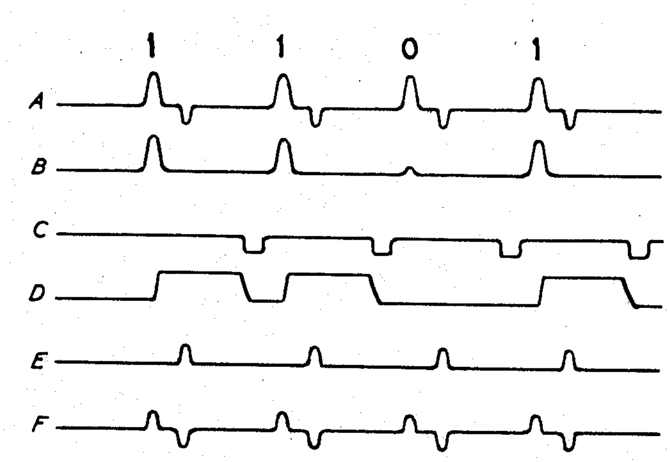
FIGURE 2 shows the waveform at selected parts of the circuit.

In FIGURE 2 is shown the relative timing of the read-out signal (A), the changes in potential of the cathode of valve 10(B), clearing pulses on line 19(C), the potential changes of valve 12 cathode (D) and pulses on line 18(E).

It will be appreciated that the use of two half currents in combination to re-insert data into a selected core is necessary because the winding 5, for example, is common to all the cores of a column. If each column contains a single core, then a full current pulse may be produced in the winding 5 and the read-out half current pulse dispensed with.

The invention has been described in relation to a storage matrix using toroidal magnetic cores as bi-stable state storage elements. In such an arrangement, the cores are usually physically positioned in rows and columns for convenience of wiring, although this is not essential. A comparable arrangement uses a plate of ferrite or similar material having a pattern of holes through which the windings are threaded. The material surrounding each hole behaves in the same manner as a toroidal core for storage purposes, although it is physically part of the plate.

The storage effect of other bi-stable state elements may be used, instead of magnetic cores, by suitable modification of the operating circuits. For example, ferro-electric storage elements may be used. Such elements are voltage operated rather than current operated so that the driving arrangements for a ferro-electric storage matrix generate full and half voltages instead of the full and half currents used with magnetic cores. Similarly, valve or transistor trigger circuits are voltage pulse operated devices.

The state of the magnetic core storage elements is sensed by resetting all the elements which are to read out to a pre-determined state, thus destroying the stored information. It is possible, however, to sense the state of the various kinds of bi-stable storage elements without destroying the information. For example, a magnetic field may be applied to a toroid perpendicular to the remanent field. This has the effect of inducing a pulse, in a read out winding on the toroid, which is indicative of the magnetic state, without permanently altering the state. In the case of a valve trigger circuit one of the well known gating circuits may be controlled by the anode voltage of one of the valves of the trigger circuit and by a pulse applied thereto. It will be apparent that when the stored information is not destroyed that either a resetting operation must be performed immediately before re-insertion of data, or that the re-insertion circuits must be modified to provide output signals representing both states, e.g. a positive or a negative pulse, so that each element is forcibly set to the required state.

Figure 3:
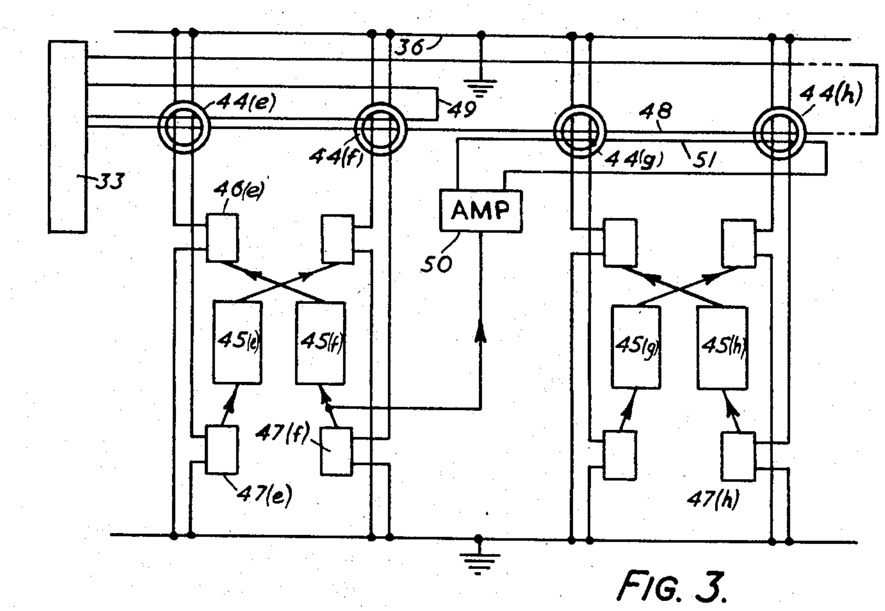
FIGURE 3 is a block schematic diagram of two stages of a binary counter.

By means of a further modification, the re-insertion circuit of the invention can be used to provide a binary counter, shown schematically in FIGURE 3.

44*e*, 44*f*, 44*g* and 44*h* are the first four cores of a row of cores. Associated with the column windings of each core are readout transformers 47 and write-in transformers 46 which correspond to the transformers 9 and 8 respectively in FIGURE 1 and which are similarly linked with the cores through the column windings. A re-insertion circuit 45 associated with each core, is similar to that already described and serves to insert data read out from the core into an adjacent core. The cores operate in pairs as binary trigger stages, the circuit 45e operating to transfer the setting of core 44e to 44f, and the circuit 45f serving to transfer the setting of core 44f to core 44e.

The two cores 44g and 44h are similarly cross linked through their respective re-insertion circuits 45g and 45h, so that the setting of one is transferred to the other. Initially one core of each pair (44e and 44g for example) is set and the other unset.

All the cores in a row are linked by a winding 48 on which appears a read-out signal slightly different from that already described. The read-out signal required to operate the counter consists of a half-current unsetting pulse followed after a short interval by a half-current setting pulse (FIGURE 2F), applied from the circuit 33. In addition, the first pair of cores 44e and 44f are linked by a winding 49 which carries a half-current unsetting pulse coincident with the half-current unsetting pulse of the read-out signal on winding 48.

Each input pulse to be counted operates the circuit 33, so that two half-current unsetting pulses are applied to the first pair of cores. Core 44e is unset and, during the second part of the read-out signal on line 48, the re-insertion circuit 45e sets core 44f. The second input pulse results in core 44f being unset and 44e being set. The output from transformer 47f besides operating circuit 45f, also operates an amplifier 50 which produces a half-current unsetting pulse in a winding 51 linking the two cores 44g and 44h of the next stage. When core 44f is unset, therefore, core 44g is unset by the joint action of half-current pulses in windings 48 and 51. Core 44h is set during the second part of the read-out pulse on winding 48.

At the fourth input pulse, core 44h unsets and an output will be passed by transformer 47h which can be connected to an amplifier (not shown) controlling a similar pair of cores comprising a third stage and so on. The output from the transformer 47 of the final stage can be used to indicate that the full capacity of the counter has been reached.

The duration of the pulses on line 48 must be such that a carry may be propagated from the first pair of cores to the last pair.

Each row of cores in the matrix may be used as an independently operable binary counter. Each reinsertion circuit then serves for all the cores in the same column.

The various gate circuits such as 15, 39, 41, etc. which are employed are all logical "AND" gates. Many different arrangements for performing this logical function are well known, such as a multi-grid valve, interconnected diodes or a saturable magnetic core.

What I claim is:

1. Information storage apparatus including a plurality of bistable storage devices forming a matrix having rows and columns, each device having first and second stable states, a separate row line for each row interconnecting all the devices in the associated row, means for applying a read-out signal selectively to any one of said row lines to cause resetting to said first state of any devices which are in the second state, a first and a second column line for each column, each independently interconnecting all the devices in the associated column, a separate signal transfer circuit for each column having an input which is coupled to the first column line of the associated column and an output which is coupled to the second column line associated with another column, each said signal transfer circuit being responsive to signals appearing on the first column line to which it is coupled, in response to resetting of a device in that column to produce a signal on the second column line to which its output is coupled and means for rendering the devices of a selected row responsive to said second column line signals to be set thereby from the first to the second state.

2. Information storage apparatus according to claim 1 in which each said signal transfer circuit further includes a second output coupled to the second column line associated with the same column and means for selecting at which of the first and second outputs a particular signal is produced.

3. Information storage apparatus according to claim 1 in which each said signal transfer circuit further includes at least one further output coupled to the second column line associated with a further column and means for selecting at which of the first and further outputs a particular signal is produced.

4. Information storage apparatus according to claim 1 in which the bistable storage devices are cores of ferromagnetic material having two stable states of magnetic saturation and a substantially rectangular hysteresis loop.

5. Information storage apparatus according to claim 1 in which each signal transfer circuit further includes a second input for connection to an external signal source and responds to signals applied to said second input to produce a signal on the second column winding to which its output is coupled.

6. Information storage apparatus including a plurality of bistable storage devices forming a matrix having rows and columns, each device having first and second stable states, a separate row line for each row interconnecting all the devices in the associated row, means for applying a read-out signal selectively to any one of said row lines to cause re-setting to said first state of any devices which are in the second state, a first and a second column line for each column, each independently interconnecting all the devices in the associated column, a separate signal transfer circuit for each column having an input which is coupled to the first column line of the associated column, at least two outputs each of which is coupled to a different second column line, and selectively operable signal gating circuits each coupling the input to a different one of the outputs, each signal transfer circuit being responsive to signals appearing on the first column line to which it is coupled, in response to resetting of a device in that column to produce a signal on a selected one of the second column line to which its outputs are coupled and means for rendering the devices of a selected row responsive to said second column line signals to be set thereby from the first to the second state.

7. Information storage apparatus including a plurality of bistable ferromagnetic core storage devices forming a matrix having rows and columns, each device having first and second states of magnetic saturation, a separate row winding for each row linked with all the devices in the associated row, means for applying a read-out signal selectively to any one of said row windings to cause re-setting to said first state of any devices which are in the second state, a first and a second column winding for each column, each linked with all the devices of the associated column, a separate signal transfer circuit for each column having an input coupled to the first column winding of the associated column, and an output which is coupled to the second column winding of another column, each said signal transfer circuit being responsive to the current generated in a first column winding on re-setting of a device linked to the winding to cause a partial setting current to flow in the second column winding with which it is coupled, and means for causing a partial setting current to flow in a selected row winding coincidentally with the partial setting currents in the second column windings to set from their first to their second state those devices which are linked to both a row winding and a second column winding in which a partial setting current is flowing.

8. Information storage apparatus according to claim 7 in which each said signal transfer circuit further includes a second output coupled to the second column winding associated with the same column and means for selecting at which of the first and second outputs a particular signal is produced.

9. Information storage apparatus according to claim 7 in which each said signal transfer circuit further includes a second output coupled to the second column winding associated with a further column and means for selecting at which of the first and second outputs a particular signal is produced.

10. Information storage apparatus according to claim 7 in which each signal transfer circuit further includes a second input for connection to an external signal source and responds to signals applied to said second input to produce a signal on the second column winding to which its output is coupled.

11. Information storage apparatus including a plurality of bistable ferromagnetic core storage devices forming a matrix having rows and columns, each device having first and second states of magnetic saturation, a separate row winding for each row linked with all the devices in the associated row, means for applying a read-out signal selectively to any one of said row windings to cause re-setting to said first state of any devices which are in the second state, a first and a second column winding for each column, each linked with all the devices of the associated column, a separate signal transfer circuit for each column having an input coupled to the first column winding of the associated column, at least two outputs each of which is coupled to a different second column winding and selectively operable gating circuits each coupling the input to a different one of the outputs, each signal transfer circuit being responsive to the current generated in the first column winding to which its input is coupled, on re-setting of a device linked to the winding to cause a partial setting current to flow in a selected one of the second column lines to which its outputs are coupled, and means for causing a partial setting current to flow in a selected row winding coincidentally with the partial setting currents in the second column windings to set from their first to their second state those devices which are linked to both a row winding and a second column winding in which a partial setting current is flowing.

12. Apparatus for rearranging stored items of information comprising a plurality of bistable magnetic storage cores for storing a like plurality of items, the cores being arranged in rows and columns; first column windings each linking with all the cores of a column; second column windings each linking with all the cores of a column; row windings each linking with all the cores of a row; means for entering items of information each directly into a separate selected core of the matrix comprising first means operable to energize a selected row winding in one sense, and means operable concurrently to energize selected ones of said second column windings corresponding respectively to the information items to be entered to switch those cores linked both with the energized row winding and an energized second column winding to a first stable state to store the entered information items; means for reading out the items stored in a row of cores, comprising second means for energizing in an opposite sense the row winding linking with the cores in the corresponding row to switch those cores of the row in which an item is stored from said first to a second stable state, and means coupled to each said first column winding and operable in response to the occurrence of a signal generated therein in response to the switching of a core linked therewith from said first to said second stable state to generate a read-out signal representing an item read out; a gating device associated with each matrix column; means for applying said read-out signal to the associated gating device, each gating device being operative in response to a read-out signal applied thereto to operate said second column winding energizing means associated with a different column from that which the stored item was read out and means for concurrently operating the first row winding energizing means of a selected row to store the information item read out in a different one of the storage cores.

13. Apparatus for rearranging stored items of information comprising a plurality of bistable magnetic storage cores for storing a like plurality of information items, the cores being arranged in rows and columns; first column windings each linking with all the cores of a column; second column windings each linking with all the cores of a column; row windings each linking with all the cores of a row; means for initially entering items of information each directly into a separate selected core of the matrix, comprising first means operable to energize a selected row winding in one sense, and means operable to energise selected ones of said second column windings corresponding respectively to the information items to be entered to switch those cores linked both with the energized row winding and an energized second column winding to a first stable state to store the entered information items; means for reading out the items stored in a row of cores, comprising second means for energizing in an opposite sense the row winding linking with the cores in the corresponding row to switch those cores of the row storing an information item from said first to a second stable state, and means coupled to each said first column winding and operable in response to the occurrence of a signal generated therein in response to the switching of a core linked therewith from said first to said second state to generate a read-out signal representing an item read-out; a gating device associated with each column of cores operable in response to an applied signal to produce an output signal on a selected one of at least two outputs; means for applying said read-out signal to the gating device associated with the column in which the read out item was stored; means for connecting a first one of said outputs to operate, in response to said output signal, the second column winding energizing means of the column from which the item was read out; means for connecting a different one of said outputs to operate, in response to said output signal, the second column winding energizing means of a different column from that from which the item was read out; means for selecting one of said outputs to carry said output signal, and means for operating said first row winding energizing means of a selected row in said one sense concurrently with the occurrence of said output signal.

14. Apparatus for rearranging stored items of information comprising a plurality of bistable magnetic storage cores arranged in rows and columns, each core being settable to a first stable stage to store an individual information item; row windings each linking with all the cores of a row; means for energizing with resetting current a selected row winding to reset from said first to a second stable state those cores in the selected row which are currently storing an item; first column windings each linking with all the cores of a column; separate means for each column coupled to a first column winding and responsive to a signal induced therein by the resetting of a core to generate a read-out signal representing the item of data stored by the core; a gating device associated with each column having two output lines and being operative in response to an applied signal to pass an output signal to a selected one of said output lines; means for selecting one of said output lines to carry said output signal; means for applying said read-out signal to said gating device; second column windings each linking with all the cores of a column; means connecting one of said output lines to the second column winding of that column of cores from which said read-out signal was derived; means connecting the other of said output lines to the second column winding of a different column of cores, both said connecting means being operable in response to said output signal to generate a half current writing signal in said second column winding; means for applying a further half current writing signal to a selected row winding concurrently with the said generation of a half current signal in the selected second column winding, a core linked with a row winding and a second column winding both carrying half current writing signals concurrently being set to said first stable state to store an information item; and means for separately applying a signal representing an information item to be newly entered into the matrix to said gating device concurrently with the selection by said output line selecting means of said one of said output lines.

15. Apparatus for rearranging stored items of information comprising a plurality of bistable magnetic storage cores arranged in rows and columns, each core being settable to a first stable state to store an individual item of information; row windings each linked to all the cores of a row; means for selectively applying control signals including a reading control signal and a writing control signal to the row windings during a reading phase and a writing phase respectively, a reading control signal being a switching current applied in one direction to a row winding and a writing control signal being a partial switching current applied in the opposite direction to a row winding after the cessation of said reading control signal, and the application of said reading control signal to a selected row winding being effective to switch all those cores storing an information item in the row linked therewith from said first to a second stable state to read out the stored information items; first column windings each linked with all the cores of a column; means coupled to each said first column winding and responsive to a signal induced therein by the switching of a core from said first to said second stable state to generate a read-out signal representing the information item previously stored in the core; means associated with each column for storing the read-out signal; a gating device associated with each column and responsive to an applied signal to generate an output signal on a selected one of a group of output lines; means for applying during said writing phase said read-out signal from the storage means to the gating device associated with the column from which the item representing read-out signal was derived; second column windings each linked with all the cores of a column; connecting means for applying an output signal carried by one of said group of output lines during said writing phase as a partial switching current to the second column winding of that column from which the stored item was read-out; further connecting means for applying output signals carried by different other ones of said group of output lines during said writing phase respectively to second column windings of columns other than that column from which the stored item was read out, and means for selecting one of the output lines of the group to carry the output signal, a core linked both with a row winding and a column winding concurrently carrying partial switching currents being switched to said first stable state.

References Cited in the file of this patent

UNITED STATES PATENTS

| | | |
|---|---|---|
| 2,709,248 | Rosenberg | May 24, 1955 |
| 2,734,187 | Rajchman | Feb. 7, 1956 |
| 2,768,367 | Rajchman | Oct. 23, 1956 |
| 2,784,391 | Rajchman | Mar. 5, 1957 |
| 2,800,643 | Mestre | July 23, 1957 |
| 2,802,203 | Williams | Aug. 6, 1957 |
| 2,844,812 | Auerback | July 22, 1958 |
| 2,884,621 | Ross | Apr. 28, 1959 |
| 2,910,674 | Wittenberg | Oct. 27, 1959 |